March 25, 1952 M. B. ROBINSON 2,590,574
STEERING MEANS FOR VEHICLES
Filed Oct. 5, 1944 8 Sheets-Sheet 1

INVENTOR.
BY Marion B. Robinson

March 25, 1952 M. B. ROBINSON 2,590,574
STEERING MEANS FOR VEHICLES
Filed Oct. 5, 1944 8 Sheets-Sheet 2

FIG-3

INVENTOR.
BY Marion B. Robinson

March 25, 1952 M. B. ROBINSON 2,590,574
STEERING MEANS FOR VEHICLES
Filed Oct. 5, 1944 8 Sheets-Sheet 3

INVENTOR.
BY Marion B. Robinson

March 25, 1952

M. B. ROBINSON 2,590,574

STEERING MEANS FOR VEHICLES

Filed Oct. 5, 1944

INVENTOR.
Marion B. Robinson

March 25, 1952     M. B. ROBINSON     2,590,574
STEERING MEANS FOR VEHICLES
Filed Oct. 5, 1944     8 Sheets—Sheet 8

INVENTOR.
BY Marion B. Robinson

Patented Mar. 25, 1952

2,590,574

UNITED STATES PATENT OFFICE 2,590,574

STEERING MEANS FOR VEHICLES

Marion B. Robinson, Great Neck, N. Y.

Application October 5, 1944, Serial No. 557,289

3 Claims. (Cl. 244—14)

This invention is for radiant energy or energy controlled means which may embrace radiant energy, light waves, sound waves, heat waves, magnetic forces, barometric pressure or any equivalent thereof for actuating suitable means for steering a vehicle to its destination and is applicable to vehicles which may vary widely in type and form and which may embrace motor or rocket propelled aircraft, motor or rocket propelled surface or underwater craft, motor or rocket propelled land vehicles, rocket propelled missile or missiles which are projected and drop from an elevation or which are dropped from aircraft toward an objective and this invention as a part thereof has been disclosed in my co-pending application Serial No. 546,275, filed July 24, 1944, which has become abandoned; and this application is also related to the disclosures of the following other applications Serial No. 340,629 filed June 15, 1940, which has become abandoned, Serial No. 418,497 filed November 10, 1941, which has become Patent No. 2,520,433, Serial No. 486,-583 filed May 11, 1943, which has become abandoned, Serial No. 541,219 filed June 20, 1944, which has also become abandoned, all entitled Projectile Methods and Means.

The invention broadly comprehends in any type of vehicle, radiant energy or energy controlled means for directing the same by the transmission of oscillations or vibrations to a receiving set carried by the vehicle for actuating means for steering the same whether or not the sending set is carried by the vehicle and reflected from an objective or one or more sending sets are mounted or carried elsewhere and the oscillations transmitted thereto by manually controlled means or whether or not the oscillations or vibrations are created by the target.

The invention also embodies vehicle steering means which includes in combination a time controlled mechanism for initially actuating the steering to direct the vehicle to a predetermined level, a gyroscopically controlled means for maintaining the vehicle at said predetermined level and radio controlled means operative by oscillations received thereby for directing the vehicle to an objective and which radio means when active functions to render the gyroscope level maintaining means ineffective so that the steering of the vehicle is then solely under the radio controlled means.

The invention also contemplates a vehicle steering means which includes in combination a time controlled mechanism for initially actuating the steering to direct the vehicle to a predetermined level, a gyroscopically controlled means for maintaining the vehicle at said predetermined level, a second gyroscopically controlled means for maintaining the vehicle in a predetermined direction and a second time controlled means for actuating the steering means to turn the vehicle in a predetermined direction.

The invention also contemplates a vehicle directing means including a rudder and elevator for respectively turning a vehicle laterally by movement of the rudder alone or directing said vehicle vertically to ascend or descend by movement of the elevator alone or for directing said vehicle both laterally and vertically by simultaneous movements of the rudder and elevator, which directing means utilizes a pair of radio receiving sets mounted on the vehicle for respectively actuating the rudder and elevator and which receiving sets are each of the discriminating circuit type having respectively a pair of parabolic antennas with a shielding means separating each antenna, spaced apart and facing outwardly and so located with reference to each other and the vehicle as to cause each circuit to respond to deviations from a predetermined course to actuate the rudder and elevator so as to correct the deviation.

The invention also contemplates a vehicle directing means, including a rudder and elevator for respectively turning a vehicle laterally or vertically or at angles to both laterally and vertically by movements of rudder and elevator, which directing means utilizes a pair of radio receiving sets mounted on the vehicle for respectively actuating the rudder and elevator and which receiving sets are each of the discriminating circuit type having respectively a pair of parabolic antennas spaced apart and facing outwardly and so located with reference to each other and the vehicle as to cause each circuit to respond to waves of varying strength caused by the facing position of the antennas to the incoming oscillations or vibrations.

As a further feature, the invention resides in a vehicle having rocket propulsion means and radio controlled steering devices with means for rendering the radio control effective to control the rocket propulsion means either before, after or simultaneously with the actuation of the steering devices by the radio control means.

The invention also contemplates broadly any type rocket motor, rocket charge or jet propulsion for driving a vehicle in combination with any type of automatic control means for steering said vehicle.

With the above enumerated and other objects in view, the invention is set forth in greater detail in the following specifications, particularly pointed out in the appended claims and illustrated in the accompanying drawings, in which:

Fig. 11 is a diagrammatic view of a low frequency transmitter for use with the low frequency receiver.

Referring to the drawings by characters of reference A designates generally a vehicle which as previously stated may be of any desired form and the term "vehicle" is employed broadly to cover any type of carrier such as for instance for transporting a destructive charge which is adapted for demolishing, damaging, or destroying a target whether said target be an objective on land, in the air or on the surface of or under the water. It will therefore be understood that when the term "vehicle" is used it may cover any one of a number of various types such as a motor propelled or rocket propelled aircraft or motor propelled or rocket propelled surface or submersible craft or a motor propelled or rocket propelled land craft or a missile which is projected by an explosive or gaseous propelling charge in the general direction of the target or which may be dropped from an elevation toward the target.

Figures 1, 2:
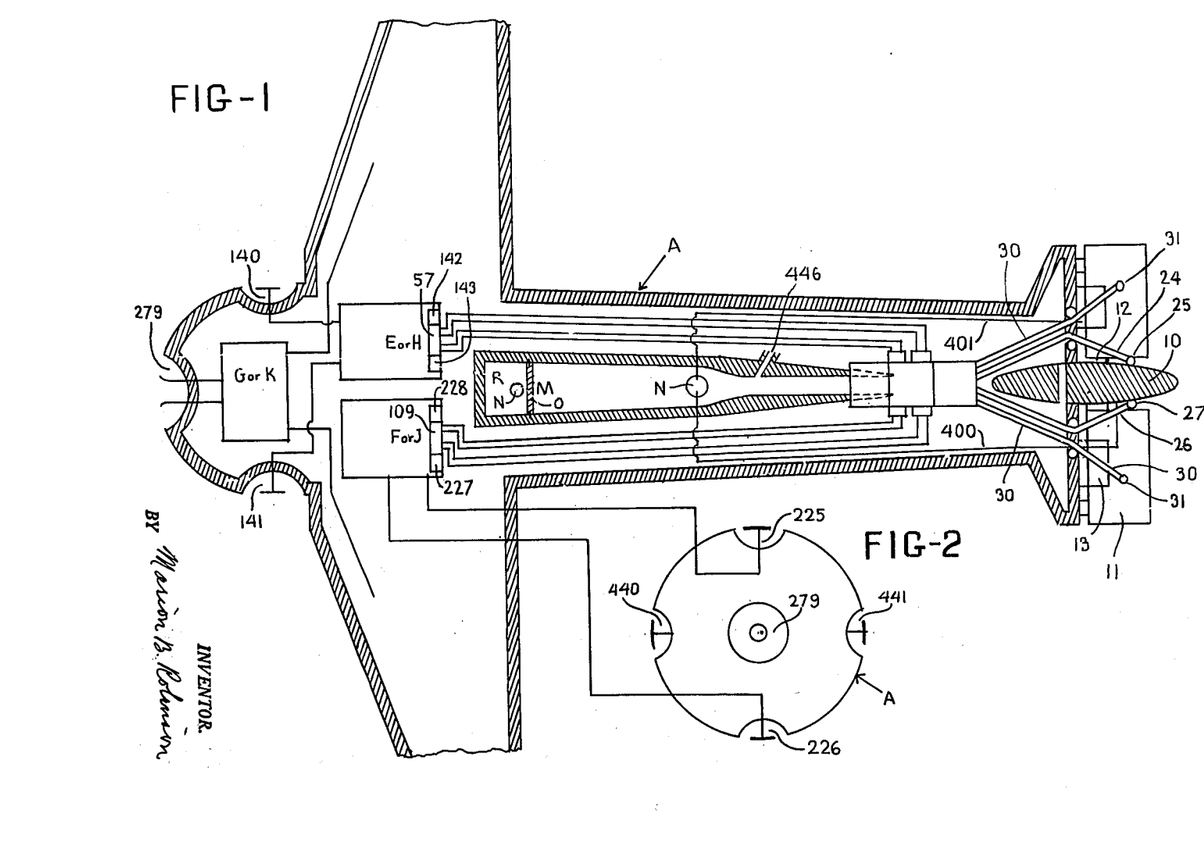
Fig. 1 is a diagrammatic plan view of a vehicle in the form of a dirigible glider or aircraft.
Fig. 2 is a diagrammatic front view of the nose of the aircraft illustrating the arrangement of the sending and receiving antennas.
Figure 3:
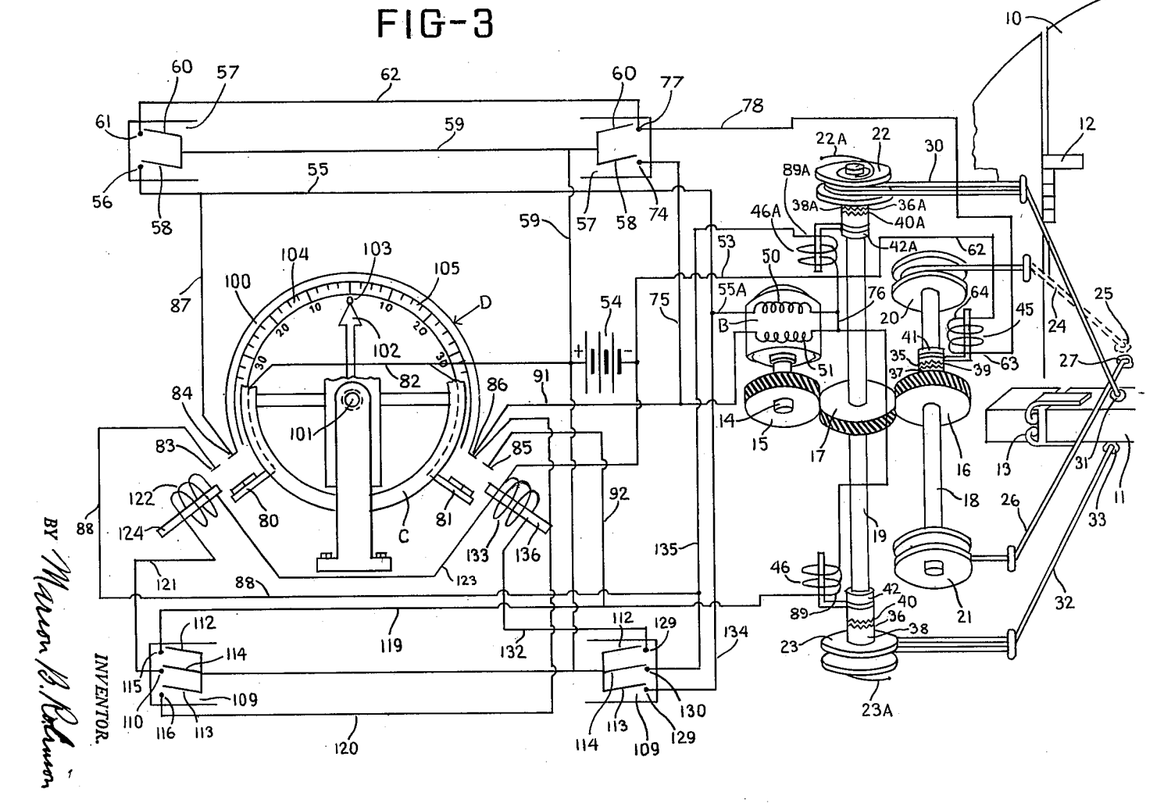
Fig. 3 is a diagrammatic view of the rudder and elevator control mechanism showing the electrical wiring and the radio actuated relay switches in combination with the time and gyroscopically controlled level seeking and maintaining means for actuating the rudder and elevator to steer the craft.

The projectile or vehicle A is shown in the form of a rocket plane or glider craft having a hollow body or fuselage and wings together with a tail structure of any desired form which essentially includes a vertically disposed laterally swingable rudder 10 and horizontally disposed vertically swingable elevator 11, which rudder and elevator are normally maintained in a straight away position to guide the vehicle in the direction of its longitudinal axis by means of springs 12 and 13 which tension the same against movement from said normal position. These springs are only diagrammatically illustrated and may be either of the flat spiral type, or the flat helical type or any known type of spring. The springs 12 and 13, shown in Fig. 1 and Fig. 3, are shown as the flat helical type fastened in any desirable manner at one end of the stationary part of the body A that forms part of the rudders and elevators and to which the rudders and elevators are hinged. The opposite end of the springs 12 and 13 are shown overlapping the movable part of the rudder and elevators. There is a duplicate of spring 12 on the opposite side of the rudder as shown in Fig. 1, and a duplicate of spring 13 on the opposite side of the elevator as shown in Fig. 3. As the elevators or rudder move in either direction a tension is placed on one of the springs.

Figure 5:
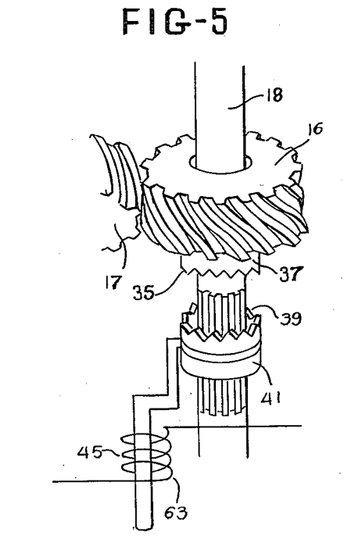
Fig. 5 is an enlarged fragmentary perspective view illustrating in more detail the gearing and clutch means controlling drum shafts.

The mechanism for imparting movement to the rudder 10 and to the elevator 11 consists of a reversible electric motor B, the shaft 14 of which has keyed thereto a helical tooth drive gear 15 which meshes with an intermediate helical tooth pinion 17 fixedly keyed to the drum shaft 19. The pinion 17 has constant meshing engagement with the drum pinion 16 which is loosely mounted on the drum shaft 18. The drum shaft 18 which controls the movement of the rudder 10, has secured to the opposite ends thereof winding drums 20 and 21 while the drum shaft 19 which controls the movement of the elevator 11, has loosely mounted to its opposite ends winding drums 22 and 23. A flexible element 24 such as a cable is secured at 25 to one side of the rudder 10 and leads through suitable guide means and is anchored to and wound upon the drum 20, while a cable 26 is secured at 27 to the opposite side of the rudder 12 and leads through suitable guide means and is anchored to and wound upon the drum 21, the winding of the cable 24 upon its drum 20 being in a direction opposite to the direction which the element 26 is wound upon its drum 21. By this arrangement it will be apparent that rotation of the drum shaft 18 in one direction, for instance in a counter-clockwise direction, will wind the cable 24 upon its drum 20 while unwinding the cable 26 from its drum 21, thereby swinging the rudder 10 to the right. Conversely, when the drum shaft 18 is rotated in the opposite or clockwise direction, the cable 26 will be wound upon its drum 21 and the cable will be unwound from its drum 20 to swing the rudder 10 to the left.

The elevator 11 is similarly controlled by cables 30 secured at 31 to the upper side of the elevator 11 and which cables lead therefrom through suitable guide means and are anchored to and wound upon the drum 22 in one direction, with cables 32 secured at 33 to the underside of the elevator 11 and leading therefrom through suitable guides and anchored to and wound upon the drum 23 in an opposite direction to the windings of the cable 30 upon their drum 22.

Rotation is imparted to the drum shafts 18 and the drums 22 and 23 when the motor B is running, by connecting said shaft and drums with their respective pinions 16 and 17 through the medium of clutch means, while as shown consists of clutch teeth 35, 36 and 36A formed on the collars 37, 38 and 38A of the pinions 16 and drums 22 and 23 and clutch teeth 39, 40 and 40A formed on clutch sleeves 41, 42 and 42A splined on the drum shafts 18 and 19 respectively. Solenoids 45, 46 and 46A are operatively connected with the clutch sleeves 41, 42 and 42A for shifting said sleeves to active and inactive positions to couple and uncouple the drum shafts 18 and the drums 22 and 23 with the pinions 16 and 17.

The reversible electric motor B includes separate solenoid windings 50 and 51 which when selectively energized reverse the polarity of the motor to rotate the motor shaft 14 in opposite directions, for example, as shown, when the winding 50 is energized the motor shaft turns in a counter-clockwise direction and when the winding 51 is energized the shaft 14 turns in a clockwise direction. The winding 50 is included in an electric circuit comprising the feed conductor wire 53 leading from one end of the winding 50 to the negative side of a storage battery 54 and a return conductor wire 55 leads from the other end of the winding 50 to the contact terminal 56 of a switch 57 being a double throw switch and arm 58 adapted when the switch 57 is closed to engage the terminal 58. The switch arm 58 is connected by a circuit wire 59 with the positive side of the battery 54. The switch arm 58 is coupled to and is movable together with a second switch arm 60 connected to the wire 59 and which switch arm 60 is adapted when the switch is closed to engage with a contact terminal 61 connected by a wire 62 with one end of the winding 63 of the solenoid 45 which shifts the clutch sleeve 41 to active position when energized. A branch wire 64 extends from the other end of the solenoid winding 63 and connects with the feed wire 53 leading to the battery 54. It thus follows that when the switch 57 is closed, thereby energizing the windings 50 of the motor to turn the same in a counter-clockwise direction, the pinion 16 will be turned in a counter-clockwise direction. At the same time, the closing of the switch 57 energizes the winding of the solenoid 45 which shifts the clutch sleeve 41 into engagement with the clutch collar 37 of the pinion 16 to turn the drum shaft 18 therewith in a counter-clockwise direction thus winding the cable 24 on the drum 20 and unwinding the cable 26 from the drum 21 to turn the rudder 10 to the right.

It is apparent that energizing of the winding 51 of the motor B will turn the motor shaft 14 in a clockwise direction resulting in the turning of the pinion 16 in a clockwise direction to turn the rudder 10 to the left with the solenoid winding 63 simultaneously energized to cause the solenoid 45 to move the clutch sleeve 41 into engagement with the collar 37. In order to accomplish this movement of the rudder, two more contact terminals are added to switch 57. The switch is shown in a second position for simplicity in showing the swinging of the switch arms 58 and 60 to either set of contact terminals 56 and 61 on the left hand side of the switch or contact terminal 74 and 77 on the right hand side, shown in second position. The switch arms 58 and 60 are attached to a pivot for swinging and connected on the wire 59 which leads to the positive side of the battery 54. The switch 57 is provided with a contact terminal 74 with which the switch arm 58 is adapted to contact and from which terminal 74 a wire 75 leads to one side of the winding 51 of the motor B, the other side of which winding is connected by a wire 76 with the feed wire 53 leading to the negative side of the battery 54. The switch 57 is provided with a contact terminal 77 adapted to be engaged by the switch arm 60 and a wire 78 leads therefrom to the wire 64 connected to the windings 63 of the solenoid 45 so as to close the circuit to said solenoid 45 coincident with the closing of the circuit through the motor winding 51. It is thus apparent that selective closing of the switch 57 will function to turn the rudder 10 respectively to the right and to the left to guide or steer the craft A to the right or left. Switch 57 is controlled by radiant energy or by a duplicate of the gyroscopic action to be explained later.

The motor B and solenoid 46 and 46A are also included in circuits for effecting the selective driving of the drums 22 and 23 in opposite direction for the purpose of swinging the elevator 11 upwardly to cause upward steering of the craft for and for swinging the elevator downwardly to steer the craft downward and this is controlled by three factors, namely by gyroscopic action, by a time controlled mechanism and by radiant energy.

Figure 4:
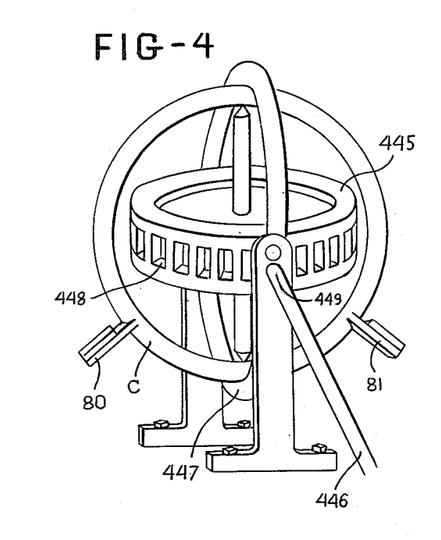
Fig. 4 is a detail diagrammatic perspective view of the gyroscope for maintaining the level of the craft.

The gyroscopic action is accomplished by means of a gyroscope C which has secured thereto a pair of contact terminals 80 and 81 located respectively forwardly and rearwardly with reference to the longitudinal axis of the craft A and which contact terminals are maintained in a constant horizontal position by the gyroscopic action of the gyroscope C irrespective of the fore and aft inclination of the craft. The contact terminals 80 and 81 are connected by a wire 82 to the return wire 59 leading to the battery 54.

The time control mechanism consists of a clock D fixed to the fuselage or body of the craft A and to which is secured pairs of contact elements 83 and 84 and 85 and 86, the former pair 83 and 84 being designed to be engaged by the contact terminal 80 and the latter pair 85 and 86 being designed to be engaged by the contact terminal 81. A circuit wire 87 leads from one contact element 84 to the wire 55 connected with the motor winding 50, while a circuit wire 88 and 135 leads from the contact 83 to one end of the winding 89A of the solenoid 46A. The other side of solenoid 46A winding and the motor winding 50 connect with feed conductor wire 53 leading to the negative side of the battery. By this arrangement if the craft A deviates from a normal horizontal path of movement downwardly, the contact elements 83 and 84 will engage the gyroscopically controlled contact terminal 80 to complete the circuits to the winding 50 of the motor B and the winding 89A of the solenoid 46A to rotate the motor shaft 14 in a counter-clockwise direction and to couple the drum 22 with the drum shaft 19 to rotate the drum 22 in a clockwise direction for winding the upper cable 30 upon the drum 22 and for unwinding the lower cables 32 from the drum 23 to swing the elevator 11 upwardly to correct the elevation and thereby maintain the craft A in substantially the selected level to which it was initially sent. A spring 22A and 23A is fastened on the drums 22 and 23 and fastened to the body to rewind the cables on the returning of the elevator to normal position.

A circuit wire 82 leads from terminal 81 on the gyroscope to the positive terminal of the battery, a circuit wire 91 leads from the contact element 86 to one side of the motor winding 51, while a circuit wire 92 leads from the contact element 85 to the wire 119 which in turn leads to the winding 89 of the solenoid 46 and wire 90 connected to the opposite side of the winding 89 and connects to wire 76, which connects to the feed conductor wire 53 to the negative side of the battery. By this arrangement, if the craft A deviates upwardly from the selected horizontal path of movement, the contact elements 85 and 86 will move into engagement with the gyroscopically controlled contact terminal 81 to close the circuits to the motor winding 51 and the solenoid winding 89 to rotate the motor B in a clockwise direction and to couple the drum 23 with the drum shaft 19 and pinion 17 to rotate the drum 23 in a counter-clockwise direction so as to wind the lower cables 32 upon the lower drum 23 and unwind the upper cables from the upper drum 22, thereby swinging the elevator 11 downwardly to correct the elevation and to return the craft A to substantially the selected level.

Figures 12, 13, 14, 15:
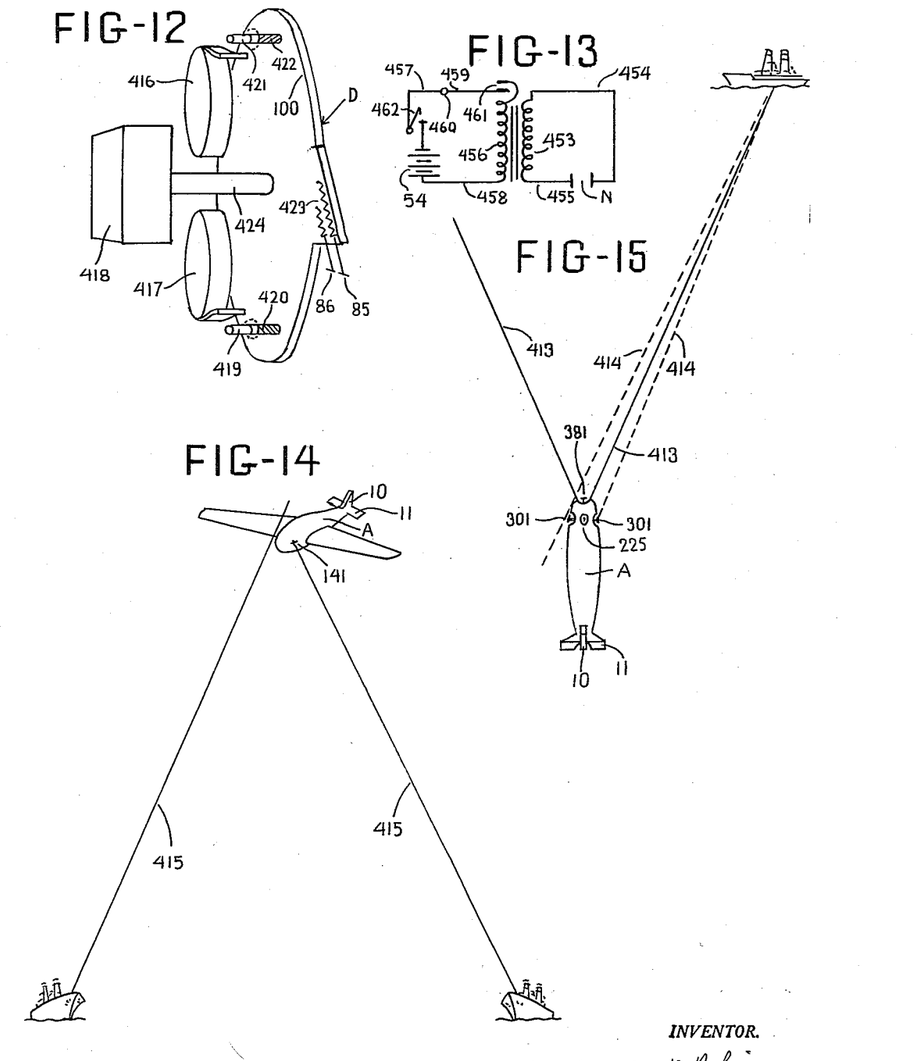
Fig. 12 is a diagrammatic view of the back of the clock dial and mechanism for controlling the dial.
Fig. 13 is a diagrammatic view of spark coil arrangement for igniting rocket charge.
Fig. 14 is a diagrammatic scene showing the beams being sent from two positions to the receiving antennas carried by the vehicle, by manually controlled means, all being in shadow but the one facing the direction of the sent wave.
Fig. 15 is a diagrammatic scene showing the conical beam being projected from the transmitting radio set mounted on the vehicle and the waves being reflected back from an object to the receiving antennas, all being in shadow but the one facing the direction of the object reflecting the wave.

The pairs of contact elements 83 and 84 and 85 and 86 are secured to diametrically opposite sides of the dial 100 of the clock D with the pair of contact elements 83 and 84 being disposed toward the forward end of the craft A with reference to the axis of the dial, which axis extends transversely of the craft and horizontally thereof. The other pair of contact elements 85 and 86 are disposed toward the rear end of the craft with reference to the dial axis 101. The clock is provided with a fixed pointer 102 and the dial is inscribed with a central "zero" graduation 103 and numbered graduations 104 and 105 which respectively increase counter-clockwise and clockwise to gauge the setting of the dial 100 to respectively cause the craft A to ascend or to descend for a predetermined period of time which, in accordance with the speed of the craft will determine the desired selected level to which it will ascend or descend. By turning the dial counter-clockwise direction to the selected graduation 105, it will be apparent that the contact elements 83 and 84 will engage with the contact terminal 80 thus closing the circuits to the motor winding 50 and the solenoid winding 89A to swing the elevator 11 upwardly for steering the craft upwardly and for maintaining the same on an upward course until the elapsed time, controlled by the clock D, returns the dial 100 to a position where the contact elements 85 and 86 engage the contact terminal 81 for a sufficient length of time to close the circuits to the motor winding 51 and to the solenoid winding 89 to swing the elevator 11 downwardly until the craft is on the selected level or the normal straight away position with reference to the longitudinal axis and the craft will be maintained on the horizontal path at the selected level by the gyroscope.

If the craft A is to be launched from an elevation such as from a plane for descent to a lower level, the dial 100 is turned in a clockwise direction until the selected graduation 104 is in registry with the pointer 102 to engage the contacts 85 and 86 with the contact 81 thus closing the circuits to windings 51 and 89 to swing the elevator 11 downwardly to steer the craft downward to the selected level determined by the elapsed time. At this time the circuits to the windings 51 and 89 are broken and the clock dial moves counter-clockwise to close the circuits to the windings 50 and 89A until the elevator is moved to its normal straight away position.

The circuits leading to windings 50 and 51 which control the direction of rotation of the shaft 14 of the motor B and the circuits leading to the solenoids 89 and 89A for coupling the drums 22 and 23 to the drum shaft 19 which swings the elevator 11 are adapted to be controlled by switch 109. The switch 109 includes three coupled switch arms 112, 113, and 114, which are adapted to be simultaneously swung into and out of engagement with three contact elements 115, 116 and 117. A circuit wire 118 connected with said switch arms leads therefrom to and is connected with the return wire 59 to the battery 54. The contact element 115 is connected by a wire 119 which leads to the winding 89 of the solenoid 46, the winding 89 connects to wire 90 and to wire 76 and 53 to the negative terminal of the battery. A wire 120 leads from the contact 116 to the contact 86 thence by wire 91 to motor winding 51 and returning to the negative terminal of the battery on wire 76 and 53. The remaining central contact element 117 of switch 109 is connected by a wire 121 to the winding of the solenoid 122 from which a wire 123 leads to the feed wire 53 of the battery 54. The core of the solenoid 122 carries an interceptor member 124 of insulation material which member is normally retracted when the solenoid 122 is de-energized but which is adapted when said solenoid is energized, to project to a position between the contact terminal 80 and the contacts 83 and 84 to prevent closing of the circuit by engagement of said contact elements 83 and 84 with the contact terminal 80, thus taking the control of the circuits from the gyroscope C and placing the same solely under the control of a switch 109 which is a double throw switch.

Three more contact terminals 124, 129 and 130 are added to switch 109, the switch is shown in a second position for simplicity, in showing the swinging of the switch arms 112, 113 and 114 to either set of contact terminals 115, 116 and 117 on the left hand side of the switch or contact terminals 128, 129 and 130 on the right hand side, shown in second position. The switch arms 112, 113 and 114 are adapted to be simultaneously swung into and out of engagement with three contact elements 128, 129 and 130. The wire 118 is connected with the switch arms 112, 113 and 114, which wire 118 leads to return wire 59 thence to the battery 54. The contact 128 of switch 109 is connected by wire 132 to one end of winding of solenoid 133, the other end of the winding of which solenoid is connected with the wire 123 to battery feed wire 53, of the negative terminal of the battery adapted when the switch arm 112 makes contact with contact terminal 128 to connect the positive terminal of the battery on wire 59 and energizing solenoid 133. The contact element 129 is connected by wire 134 to wire 55 which leads to the motor solenoid winding 50 and returns to the negative terminal of the battery on wire 53. The contact element 130 is connected by a wire 135 which leads to the windings 89A of solenoid 46A, the winding 89A connects to wire 53 and to the negative terminal of the battery. The core of the solenoid 133 carries an interceptor member 136 of insulation material which is normally retracted when said solenoid 133 is de-energized but which is adapted when said solenoid is energized to project to a position between the contact 81 and the contacts 85 and 86 to prevent closing of the circuits, thus taking control thereof from the gyroscope C and placing them solely under the control of the switch 109.

In order to provide means for effecting the opening and closing of the various switches 57 and 109, to control the rudder and elevator 10 and 11 so as to direct or steer the craft or vehicle A toward a destination or target, a pair of radio receiving sets E and F are provided, the set E being adapted for actuating the switch 57 and the latter set for actuating the switch 109.

While the above means is applied to an aircraft it is to be understood that when applied to other types of vehicles various other types of gearing now in use may be employed to control the directing means.

Figure 8:
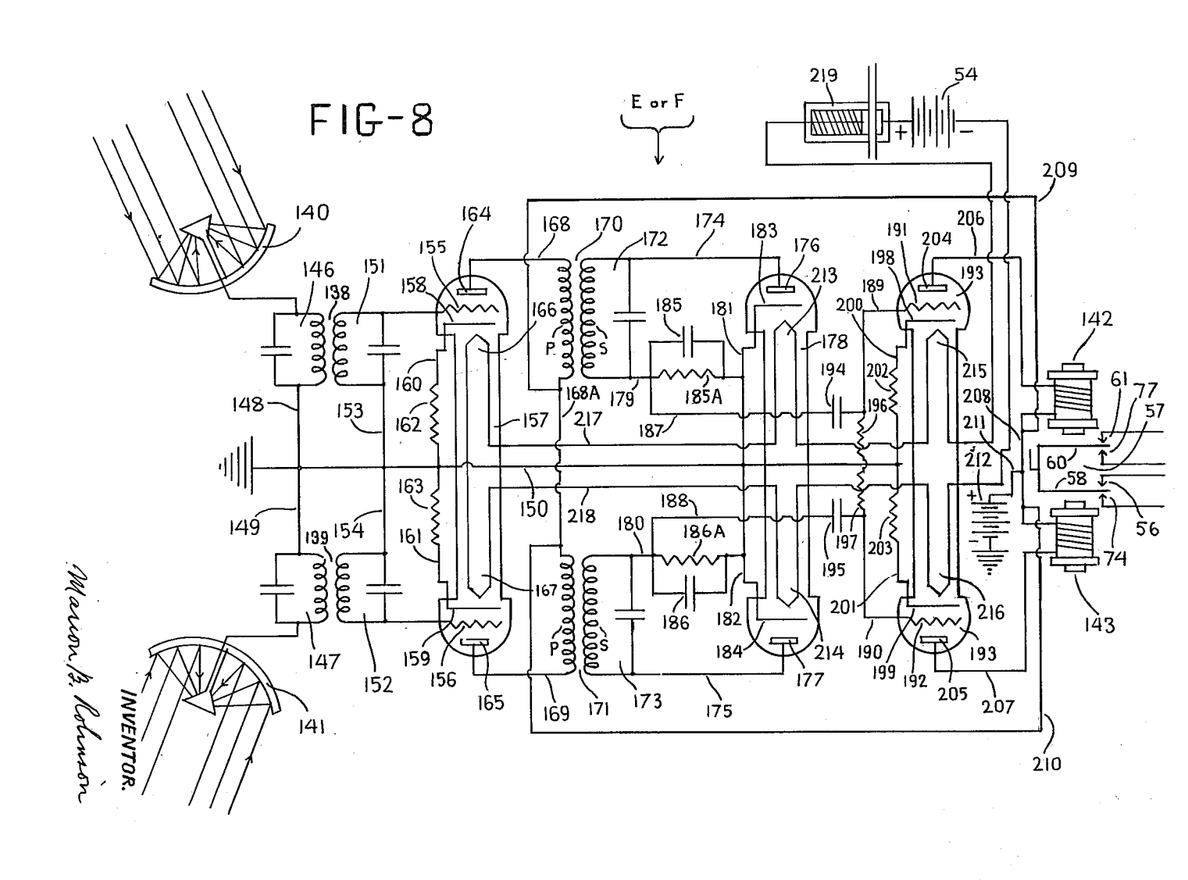
Fig. 8 is a diagrammatic view of the high frequency discriminating circuit of the radio receivers employed for actuating the control mechanism for steering the craft, certain of the elements being in exaggerated spread out relations, as the transformers, and the tubes are split so that one half of the tube is shown at the top and the other half is shown at the bottom of the circuit.

The radio receiving set E has connected therewith two parabolic receiving antennas 140 and 141 located respectively on the right and left sides of the nose of the craft A diametrically opposite each other and connected with a wiring and tube arrangement which includes a pair of solenoid coils 142 and 143 for respectively actuating the switch 57 in the manner hereafter set forth.

The discriminating means described and shown in this application is only diagrammatic and not limited to these means.

If both antennas receive the same amplitude or signal strength the rudder 10 will be held by its spring tension in a straight away position with reference to the longitudinal axis of the craft A. However if the craft deviates to the right or left from the line of direction of the objective or destination, either one or the other of the antennas 140 and 141 will receive stronger signal and the one in shadow of the weaker signal. For example, if the craft A deviates to the right of its predetermined line toward the objective, and antennas 140 on the right side of the nose will be in shadow and the antenna 141 on the left side of the nose will receive the stronger signal thereby energizing the relay 143 more than the relay 142, which swings the switch arms 58 and 60 to contact terminal 74 and 77 thus swinging the rudder 10 to the left to turn the craft to the left until its longitudinal axis corresponds to the proper course when both antennas will then be receiving signals of equal strength. So long as the signals received are of equal strength or intensity the craft will be steered directly toward its objective or destination and the switches will remain in neutral position.

As shown by way of example, the receiving set embodies two tuned frequency circuits 146 and 147 for the elimination of all frequencies but the one in which it is tuned, which are grounded by wires 148 and 149 leading to a common ground wire 150, the frequencies being passed from said tuned circuits through induction coils to the tuned circuits 151 and 152 which are also grounded to the common ground wire 150 by the wires 153 and 154. The tuned circuits 151 and 152 are respectively connected to the grids 155 and 156 of a double triode tube 157 which constitutes a radio frequency amplifier and in which the cathodes 158 and 159 are connected by wires 160 and 161, including resistors 162 and 163 and connected with the common ground wire 150. The tube 157 also includes the plates 164 and 165 and the heaters 166 and 167, the plates being respectively connected by wires 168 and 169 to the induction coils of interstage transformers 170 and 171. There is a wire 168A connecting the primary windings, to which wire 168A are connected two wires 209 and 210 leading to the positive terminal of the battery 212. The tuned secondary output circuits 172 and 173 are respectively connected by the wires 174 and 175 to the plates 176 and 177 of a double diode detector tube 178. Wires 179 and 180 having resistors 185A and 186A interposed therein, lead from the tuned circuits 172 and 173 to and connect respectively with the wires 181 and 182 which lead from the cathodes 183 and 184 of of the tube 178, which wires 181 and 182 also lead to the common ground wire 150. By-pass condensers 185 and 186 are interposed in the wires 179 and 180. Wires 187 and 188 are respectively connected with the wires 179 and 180 between their resistors 185A and 186A and the tuned circuits 172 and 173 and said wires 187 and 188 respectively lead to and are connected with the wires 189 and 190 of the grids 191 and 192 of a double triode frequency tube shown at 193, the wires 187 and 188 having interposed therein the condensers 194 and 195. The wires 189 and 190 are connected to ground wire 150 through resistors 196 and 197 while the cathodes 198 and 199 are connected by the wires 200 and 201 to the common ground wire 150 and have interposed therein resistors 202 and 203. The plates 204 and 205 of the tube 193 are respectively connected by circuit wire 206 and 207 to the relays 142 and 143 of the switch 57 and a wire 208 connects said relay coils. The wire 208 has connected therewith a conductor 211 leading to the positive side of a "B" battery 212, the negative side of which "B" battery is grounded.

The heaters 213 and 214 of the tube 178 and the heaters 215 and 216 of the tube 193 as well as the heaters 166 and 167 of the tubes 157 are all connected in series by the circuit wires 217 and 218 to the opposite poles of the main battery 54. In order to render all circuits respectively effective or ineffective, a main switch 219 is interposed in the circuit wire 217 and said main switch is held open until the craft is ready to be launched.

The circuit and tube arrangement of the receiver F which controls the opening and closing of the switch 109 is identical with the receiver E and said receiver F has two parabolic receiving antennas 225 and 226 which are located on the nose of the craft A above and below the longitudinal axis thereof, the upper antennas 225 controlling the actuation of a relay coil 227 which opens and closes the switch 109 and the lower antenna 226 controlling the actuation of a relay coil 228 which opens and closes the switch 109. The swinging of the switch arms 112, 113 and 114 depends on which of the coils 227 or 228 is energized.

Figure 9:
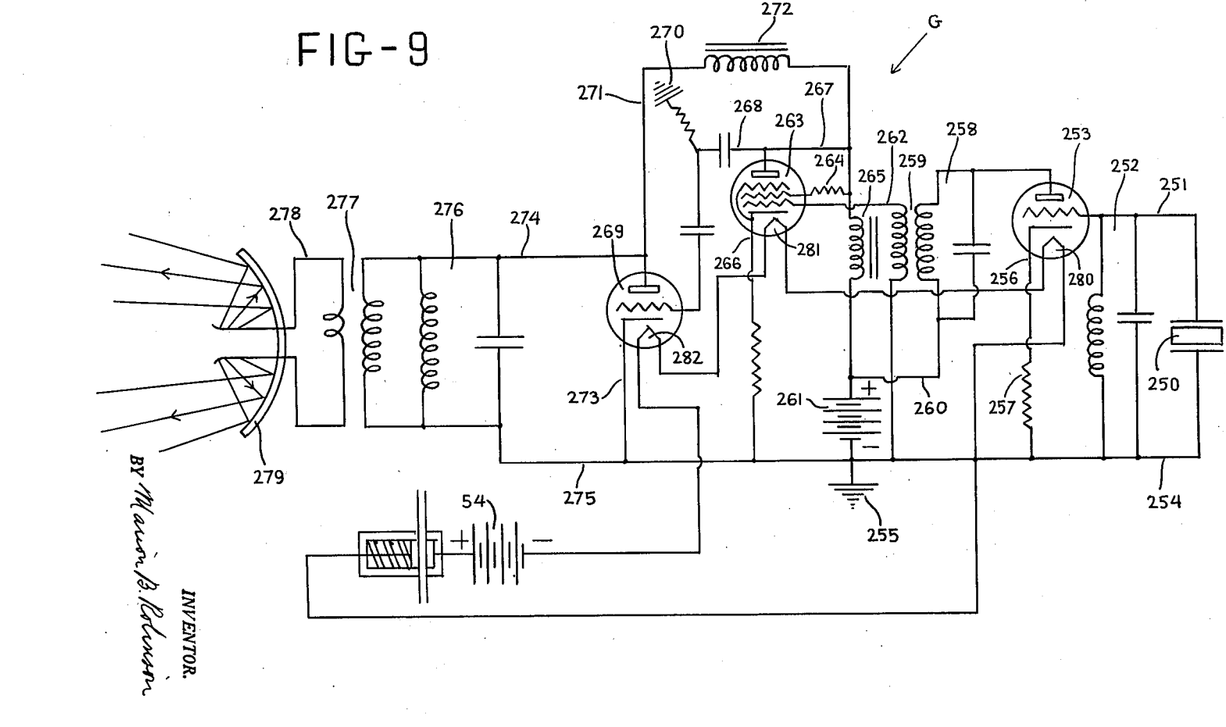
Fig. 9 is a diagrammatic view of the ultra high frequency radio transmitter employed in connection with the ultra high discriminating circuit of the radio receivers.

The high frequency transmitter which is employed in connection with the receivers E and F to control the steering means on the vehicle or craft A is designated generally by the reference character G and is here shown as mounted on the vehicle or craft for generating and transmitting oscillations which are projected forwardly from the nose of the craft in a conical beam to be reflected by an objective so that the reflected oscillations are picked up by the antennas 140, 141, 225 and 226 of the receivers E and F to guide and direct the vehicle or craft A to an objective which comes within range of the beam. The invention however is not necessarily limited to the amount of the transmitter G on the vehicle as it is understood that one or more of the transmitters may be located or mounted elsewhere with reference to an objective or destination for beaming the oscillations in such a manner as to guide or steer the vehicle.

The wiring and tube arrangement of the transmitter G is diagrammatically illustrated in Fig. 9 and is one of several types which may be employed and the output is a wave having steep sides with a frequency of several megacycles. The transmitter G as shown includes a crystal or oscillating generator 250 from which a wire 251 leads to a tuned circuit 252 and therefrom to the grid of an oscillator tube 253 while another wire 254 leads from crystal 250 to the tuned circuit 252 and thence to a ground 255. The cathode wire 256 of the tube 253 is also connected through a resistor 257 with ground 255. The plate of the oscillator tube 253 is connected to the tuned circuit 258 of a transformer 259 from one coil of which a wire 260 leads to the "B" battery 261 and is grounded at 255. A wire 262 connects one end of other coil of the transformer 259 to the grid of a modulator tube 263 while the other end of said coil leads by wire to ground at 255. The screen of the modulator tube 263 is connected through a resistor 264 and through radio frequency choke 2̄5 and the "B" battery 261 with the ground 255, said choke serving to prevent waste of radio frequency power in the battery or other parts of the circuit. The cathode wire 266 of tube 263 is connected through a resistor to the ground 255 while the plate wire 267 is connected to the "B" battery 261 through the choke 265 and thence to ground 255. The plate wire 267 is attached to wire 271 and connected through a wire 268 to the grid of a transmitter tube 239 said wire 268 having interposed therein two condensers and being grounded at 270 through a resistor. The plate wire 271 of the transmitter tube 269 is connected through a radio frequency choke 272 to the ground 255 after also passing through the choke 265 and "B" battery 261. The cathode wire 273 of tube 269 is also grounded to ground 255. The plate wire 271 and the cathode wire 273 are connected respectively to wires 274 and 275 with a tuned circuit 276 and to the linked coupling transformers 277 and thence by a wire 278 to a parabolic transmitter 279 for directing a cone-shaped beam of high frequency oscillation. The plates of all tubes are connected to the "B" battery 261 for plate voltage. The heaters 280, 281 and 282 of the tubes 253, 263 and 269 respectively are connected in series to an "A" battery which if the receiver G is mounted on the vehicle A may be the same battery 54 which furnishes the source for all of the circuits previously described.

Figure 10:
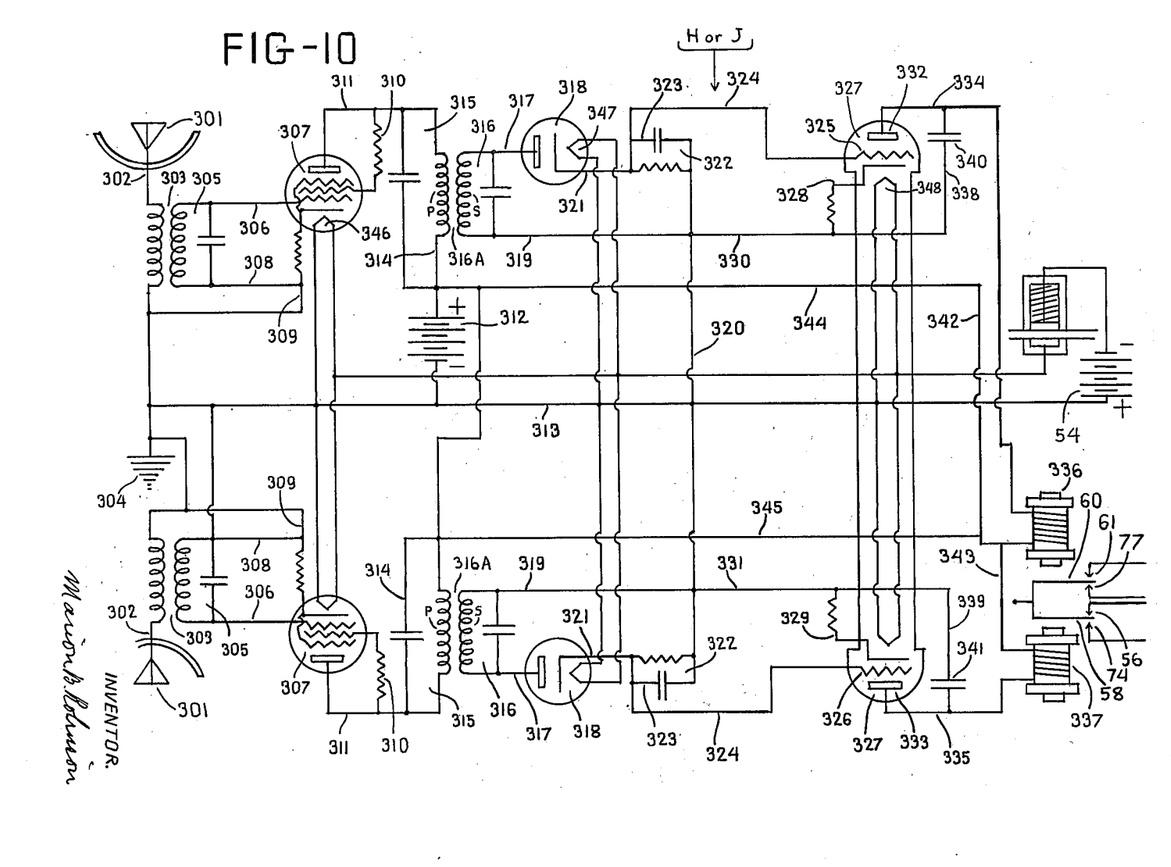
Fig. 10 is a diagrammatic view of a low frequency discriminating circuit for the radio receivers which may be employed for actuating the steering means, certain of the elements being in exaggerated spread out relations, as the transformers, and the tubes are split so that one-half of the tube is shown at the top and the other half is shown at the bottom of the circuit.

If desired low frequency discriminating circuit receivers of the type shown in Fig. 10 and designated generally by the reference character H may be substituted for the high frequency discriminating circuit receivers E and F of the type shown in Fig. 8. In this event, a low frequency transmitter of the type shown in Fig. 11 would be used in place of the high frequency transmitter shown in Fig. 9. These low frequency circuits if desired may be used on torpedoes in conjunction with a ballast air or gas tank equipped with a valve for changing the amount of air or gas to lift or lower the torpedo as described in Serial No. 340,629 filed June 15, 1940.

This discriminating circuit as shown in Fig. 10, is such that the cancellation takes place as that described in Fig. 8. They are placed in like manner as that shown in Fig. 8 so that the switch arms 30 and 58 are placed between the two magnets of the solenoids.

If the signals received and amplified in both halves of the circuit are equal or zero the core of the solenoids remain neutral. Any inequality of signal will upset the balance in the solenoids 336 and 337, thereby favoring the stronger solenoids and causing contact to be made by movement of the switch arms 58 and 60.

The low frequency receiver shown in Fig. 10, may be substituted for the receivers E and F and said receiver embodying a double tube arrangement on tube 327, one side of the circuit being described, as the other side is a duplicate. Each of said sides has a parabolic receiving crystal microphone or antenna 301 which receives the oscillations and transmits them through wire 302 to the induction coils 303 connected in series and grounded at 304. The tuned circuit 305 set to the frequency of the transmitter, causes the oscillation to be carried through a wire 306 to grids of radio frequency amplifier tubes 307. A wire 308 grounds the tuned circuits through cathode wires 309 of tube 307 which cathode wires are grounded by ground 304. The screens of tubes 307 are connected by wire 310 through resistors to wire 314 to the positive side of the "B" battery 312 and grounded at 304 by connection with a common ground wire 313 the plates of tube 307 being connected to the positive side of the "B" battery 312 by wires 314, to supply the plate voltage and grounded at 304. The tuned circuits 315 transmit oscillations to the tuned circuits 316, said oscillations being then transmitted by wire 317 to the plates of rectifier diode tubes 318, where it is converted to direct current. Wires 319 lead from the tuned circuits 316 to wire 320 attached to common ground wire 313 for grounding said tuned circuits 316. The cathode wires 312 of the tubes 318 containing a resistor, are connected with by-pass condensors 322 which are grounded by wires 320 leading to common ground wire 313. Wires 324 lead from the cathode wires 321 of tubes 318 respectively to the upper and lower grids 325 and 326 of a double triode audio frequency amplifier tube 327. The upper and lower cathodes 328 and 329 containing resistors are connected to the common ground wire 313 by wires 330 and 331. The upper and lower plates 332 and 333 of the double triode tube 327 are connected respectively by wires 334 and 335 to the coils 336 and 337 of relays which actuate either of the switches 57 and 109 which control the rudder 10 and elevator 11. Wires 338 and 339 are respectively connected with and lead from the wires 334 and 335 to and are connected with the wires 330 and 331 and grounded at 304 by wires 320 and 313, said wires 338 and 339 have arranged therein by-pass condensors 340 and 341 so that the alternating current is completely eliminated. The wires 342 and 343 lead from the coils 336 and 337 and attach to wires 344 and 345 to the tuned circuits 315 and the "B" battery 312 and grounded at 304. The heaters 346, 347 and 348 of the tubes 317, 318 and 327 are connected in parallel to the main "A" battery 54. A photo-electric cell or microphone may be placed at 301 in the above described circuit and connected with wires to the induction coil 303 as is normally done in connecting a photo-electric cell or microphone to an amplifying circuit.

The low frequency transmitter shown in Fig. 11, and designated generally by the reference character K, which is used in connection with the low frequency receiver H, and J operates on a low frequency of approximately 50 kilocycles if antennas are used or the frequency of sound so that said transmitter is capable of transmitting oscillations through the water for reflection back from a metal object to the tuned frequency receivers H. This adapts said transmitter K and receivers H for use on a torpedo together with the gyroscopically controlled means C for the rudder 10 and elevator 11 and in conjunction with the time controlled mechanism D if desired. The torpedo so equipped and controlled could be obviously either propelled by the usual motor or a rocket driven motor.

The low frequency transmitter K consists of a tuned circuit 350 connected by wire 351 through a condensor 352 with the plate of an oscillating tube 353. Said tuned circuit being connected by a second wire 354 through a condensor 355 with the grid of said tube 353. A branch wire 356 having a resister therein leads from wire 354 to the cathode of tube 353 and a wire 357 leads from the cathode wire to a common ground wire 358 thereby providing a tuned plate oscillator. The plate of tube 353 is connected by a wire 359 through a coil 360 and through a condensor 361 to the grid of a modulator tube 362 a wire 363 being connected to wire 359 between the coil 360 and condensor 361 and leading therefrom to the positive side of a "B" battery 364, the negative side of which is connected to the common ground wire 358 to provide plate voltage to the tube 353 and grid voltage to tube 362. A coupling resister 365 is interposed in a wire 366 which is connected at its opposite ends to the common ground wire 358 and the wire 359 between the condensor 361 and the tube 362. The cathode wire 367 of the modulating tube 362 containing a resister leads from the cathode through a by-pass condensor 368 and is connected with the common ground wire 358. The plate of the modulator tube 362 is connected by a wire 369 to one coil of an interstage transformer 370 thence by a wire 371 to the positive side of "B" battery 364 and ground, while the screen of said tube 362 is connected by a wire 372 to the wire 369 for screen voltage. One end of the other coil of the transformer 370 is connected by a wire 373 to the grid of a transmitter tube 374 while the other end of said coil is connected by a wire 375 to the cathode wire 376 of tube 374 which wire 376 has a resistor therein and leads to and is connected with the common ground wire 358. The plate of tube 374 is connected by a wire 377 to a tuned circuit 378 connected by a wire 379 to the positive side of the "B" battery 364 and grounded. The screen of the tube 374 is connected through a wire 380, having a resistor therein, to the wire 379 and to the "B" battery 364 and to ground. A parabolic sending antenna 381 or crystal microphone is connected by a wire 382 to series induction coil 383 which in turn is connected by a wire 384 to the common ground wire 358. The heaters 385, 386 and 387 of the tubes 353, 362, and 374 respectively are connected in series with the "A" battery 54. The radio sets shown and described are not limited to parabolic antennas but cover any type within the broad scope of the invention and it is to be understood that the cancelling means described and shown in all receivers may cover broadly any type of pick-up means as mentioned in the first paragraph of column 1 instead of the antennas, which will distinguish between differing strength of signals received by two or more means for actuating the deflecting means or for use with an oscilloscope as will be described. The invention also covers broadly any transmitting means to be used on the transmitters instead of the antennas as previously mentioned.

It is also obvious that either of the transmitters shown, the higher or lower frequency, when used in pairs and placed at two positions outside the vehicle as shown in Fig. 14 for maintaining the vehicle in a predetermined course, may each transmit a radio wave at the same time; and when the two antennas receive the two waves with equal strength or intensity as a result of the facing position of the antenna to the two incoming waves, the vehicle will be on a predetermined course and the circuit arrangement will cancel out the two signals. On the other hand, if the vehicle deviates from the predetermined course, one of the parabolic antennas will receive the signals more strongly while the other will be in relative shadow, and the two potentials appearing in the circuits will no longer be equal and opposite as they appear on the relay coil. The relay switch 57 will then be operated one way or the other in accordance with which received signal predominates. When more than two parabolic antennas are used, the same function as above described will occur.

While the vehicle or craft A may be propelled by any desired means within the broad scope of the invention, the same is disclosed herein as being equipped with any suitable type of rocket motor shown diagrammatically and designated generally by the reference character M.

In its application to a water craft, land vehicle, glider airplane or equivalent aircraft, the dial 100 of the clock D of the vehicle A is set with reference to the fixed pointer 102 to hold the elevator 11 at an agle to the longitudinal axis of the vehicle which will steer the same upwardly or downwardly for a predetermined length of time when the elevator 11 will be returned to a normal position straight away with the longitudinal axis. The gyroscope C will then function to maintain the vehicle at the level attained by making and breaking the circuits which actuate the electric motor B as heretofore described.

If an object comes within the range of the conical beam 413, Fig. 15, projected by the parabolic antenna 279 or 381 of the transmitter carried by the vehicle or craft A, the oscillations will be intercepted thereby and reflected back, shown at 414 to the receivers E and H and J, as the case may be depending upon whether or not the high or low frequency equipment is being employed. In either event, if the axis of the vehicle or craft A is in alignment with a course directed toward the objective, the discriminating circuits of said receivers will remain neutral so long as the craft A is on the course. If, however, either the objective or the craft move relatively so that the craft deviates from said course, one or the other of the receiving antennas of each receiving set will receive the stronger oscillations to actuate the relay switches to effect movement of the rudder and or elevators to correct the deviation so that the craft will eventually reach the objective. Oscillations are shown at 415, Fig. 14 and Fig. 15. The transmitted oscillations may be sent to the object from a position outside the vehicle and the oscillations reflected from the object to the antennas carried by the vehicle for directing the vehicle to the object in a manner as previously described. Where the transmitter is carried by the vehicle it may be necessary to shield the transmitter from the receiver, or operating the transmitter at slightly different intervals to the receiver, that is the transmitter has a non-conducting period in which the receiver operates and the receiver has a non-conducting period while the transmitter operates. The time determined between these intervals would depend on the time between travel of the oscillations to the object, and be reflected and returned to the receivers. The above intervals may be accomplished by a revolving disc placed on one of the cathode wires connected in the transmitter and receiver to break and make contact, thereby causing a non-operative interval. Other well known methods may be used.

If the craft A is in the nature of a bomb which is dropped or projected along an initial trajectory course toward an objective, the rocket motor or rocket propulsion means is normally inactive, as the primary motivating force will be either gravity, if dropped from an elevation, or an external projecting force if projected toward an objective. In this instance, the rocket motor or rocket propulsion means is utilized as a secondary motivating force which is only brought into play when the rudder 10 and elevator 11 are turned from their normal straight away position to impose an auxiliary supplemental propelling force or sudden "spurt" or "kick" to insure the turning of the axis of the craft A and its movement along the new path or course toward the objective. This avoids any possibility of the craft A continuing by the momentum or inertia along its original course or trajectory with its axis at an angle to said course or trajectory although said axis may be pointed toward the objective.

Figure 6:
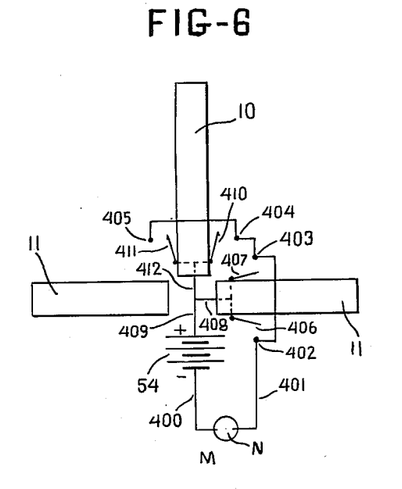
Fig. 6 is a diagrammatic view of the rudder and elevator actuated control means for rocket propulsion motor.

In order to accomplish the actuation of the rocket motor or rocket propulsion means with the actuation of the steering mechanism the normally inactive rocket motor or rocket propulsion means M is arranged in an electric circuit including a spark coil N, Fig. 6 and Fig. 13, and the battery 54 to the negative side of which the rocket motor is connected by feed wire 400 and from which motor a circuit wire 401 leads to pairs of contact elements 402 and 403 and 404 and 405 respectively arranged with the pair 402 and 403 spaced on opposite side of the elevator 11 and the pair 404 and 405 spaced on opposite side of the rudder 10.

The elevator 11 is provided with a pair of switch arms 406 and 407 protruding from the opposite side thereof and connected in parallel by a wire 408 to the positive side of the battery by a return wire 409. The rudder 10 is likewise provided with a pair of switch arms 410 and 411 protruding from the opposite sides thereof and connected in parallel by a wire 412 to the opposite side of the battery by the return wire 409. It thus follows that swinging movement of the rudder 10 to either one side or the other or upward or downward swinging of the elevator 11 will cause the switch arms to engage their respective contact elements to complete the circuit for actuating the rocket motor M by a spark coil N, contained in rocket motor, a second portion P of rocket is shown in the rocket motor M containing an additional portion of rocket charge for exerting a second "kick" or "push" after the action of the first rocket. A dividing weakened section O is adapted to be eliminated when the second rocket is ignited.

The actuation of the rocket motor or rocket propulsion means may be arranged with any of the electrical circuits as shown in my above identified copending applications, so that the rocket motor will be actuated either before, simultaneously with or after the actuation of the steering means.

Where the craft or vehicle A is equipped only with the receiving sets for actuating the rudder 10 and elevator 11, the same may be steered by remote control by one or more transmitters tuned to the same frequency as the receiving sets and having parabolic transmitting antennas for sending beamed oscillations for guiding the craft to an objective or destination, Fig. 14.

A remote control circuit may be substituted for the discriminating circuit and controlled by a multiple frequency transmitter controlled manually outside the vehicle to guide it to its destination, as described in Serial No. 541,219 filed June 20, 1944.

In order to accomplish the timing of the clock dial D, Fig. 12, two springs 416 and 417 including retarding mechanism, such as wheels and the whole mechanism including spring and wheels are fastened separate from the dial D. A protruding part on each spring adapted in such a manner that when the dial D is turned in either direction the movable pegs 419 and 421 each containing a spring in slot opening 420 and 422 catch in the protruding part of the springs 416 and 417 and wind the springs. The peg 419 and 421 are placed in a slot 420 and 422 in the rear of the clock face and the pegs are adapted to travel around the circular shape of the spring. The time determined for the dial D to return to its normal position and separate the contact segments 80 fastened to the gyroscope and 83 and 84 fastened to the dial or 81 fastened to the gyroscope and 85 and 86 fastened to the dial depend on how far the dial is turned to wind the springs 416 and 417. The dial D is fastened to a shaft which extends to a clock mechanism contained in a diagram 418 adapted after a predetermined time to turn the dial D counter clockwise and force contact segments 80 in the gyroscope to contact 83 and 84 which will force the elevators down and land the vehicle. Spring on contact shown at 423 to allow contact elements 83, 84, 85 and 86 to change position in order to not disturb the position of the gyroscope.

Figure 7:
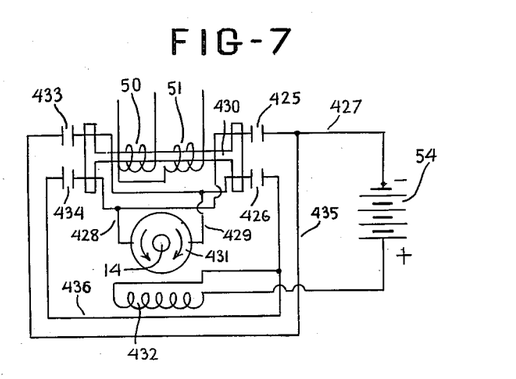
Fig. 7 is a diagrammatic view of the reversible motor switch.

The reversing switch shown in Fig. 7, when coil of motor 51 is energized pulls core 430 to the right and connects contact segments 425 and 426, connecting wire 427 from the negative terminal of the battery with wire 428 to the rotor 431 of the motor B, wire 429 connects rotor through contact segments 426 to the motor coil 432 and to the positive terminal of the battery and this operates the motor in one direction. When the coil 50 of the motor is energized core 431 is pulled to the left connecting contact segments 433 and 434, connecting the negative terminal of the battery by wire 435 and 429 to the rotor 431 of the motor B, wire 428 and 436 connect through contact segments 434 from the rotor to the motor coil 432 and to the positive terminal of the battery 54. This reverses the polarity of the motor which now operates in the reverse direction.

The gyroscope wheel 445 is forced to spin by connecting the tube 446 with the rocket motor M or a gas or air container placed in the body of the vehicle. It is shown connected to the rocket motor M at 446 to supply pressure in pockets 448 of the gyroscopic wheel. To force the gyroscope to maintain its horizontal position at all times a weight is placed at the bottom on spindle 447, or the use of a servo motor placed at a position 449.

While I have illustrated in the drawings a single gyroscope for controlling the horizontal steering means, it is to be understood that a second gyroscope may be provided, for likewise controlling the vertical steering means by adding two contact terminals secured to each side of the body to be engaged by two contact terminals secured to the second gyroscope. The action would be the same as described of contact terminals 80 and 81 contacting contact terminals 83, 84, 85 and 86. The gyroscope would be mounted to the craft horizontally.

A spark means N is contained in rocket motor M, the spark means N is connected across a secondary spark coil 453 by wires 454 and 455 of which is excited by vibrator type spark coil 456 connected to the battery 54 by wires 457 and 458, a spring 459 is fastened at 460 to wire 457, two contact elements are placed at 461. One of the contact elements is fastened to the spring 459 and the other to vibrating spark coil 456 so that when the switches as previously described and indicated at 462 are closed the contact terminal 461 induces a vibration in the coils 453 and 456 causing a spark at N. The spark arrangement just mentioned is adapted to be automatically or manually operated and may be used in any part of the vehicle to ignite the rocket portion manually by a switch arm 462 connecting wire 457 and 458 with the battery 54, placed on any part of the body or automatically operated by any one of the switches.

Certain aspects of the present disclosure are separately claimed in copending applications.

I claim:

1. In a means for controlling movement of a body from an initial position by radiation transmitted to said body from a remote source, directing means, means controlling movement of the body vertically and horizontally, means for operating the said control means, time mechanism for connecting the control means to the directing means and movable from an inoperative position for initially directing the body from said initial position to a second position, said time mechanism returnable to inoperative position upon said body being directed to said second position, gyroscopic means for connecting said operating means to said directing means for maintaining said body on a predetermined course, said gyroscopic means being ineffective to operate said control means upon connecting said control means by the time mechanism to the directing means, said gyroscopic means effective to operate said control means upon said time mechanism returning to inoperative position, means for receiving radiation from said remote source, means, normally inoperative, for disconnecting the gyroscopic means from said control means, and means for connecting said radiation receiving means to said control means and said directing means upon receiving radiation from said remote source, said disconnecting means being concurrently operated.

2. In a mechanism for controlling movement of a body, electrical operating means, directing means for said body, time mechanism, gyroscopic means, a circuit connecting said electrical operating means to said directing means, a normally open switch in said circuit and having a movable member for opening and closing said circuit, said movable member connected to the time mechanism whereby said normally open switch is selectively closed during a predetermined period to thereby direct the body from a first position to a second position, said gyroscopic means controlling said normally open switch, said gyroscopic means being ineffective upon closing said switch by said time mechanism, radiation receiving means, a second circuit, a normally open second switch in said second circuit, said second switch being closed upon receiving radiation by said receiving means, said second circuit connecting the electrical operating means to the directing means and normally inoperative means for maintaining said first switch open, said normally inoperative means operated to maintain open said first switch upon closing said second switch.

3. The mechanism of claim 2, said body being rocket propelled concurrently with connecting the said electrical operating means to said directing means.

MARION B. ROBINSON.

REFERENCES CITED

The following references are of record in the file of this patent:

UNITED STATES PATENTS

| Number | Name | Date |
| --- | --- | --- |
| 1,121,563 | Leon | Dec. 15, 1914 |
| 1,370,688 | Hammond | Mar. 8, 1921 |
| 1,418,605 | Sperry | June 6, 1922 |
| 1,670,641 | Sperry | May 22, 1928 |
| 2,051,974 | Warner | Aug. 25, 1936 |
| 2,077,401 | Crosby | Apr. 20, 1937 |
| 2,109,475 | Fanning | Mar. 1, 1938 |
| 2,165,800 | Koch | July 11, 1939 |
| 2,176,469 | Mouiex | Oct. 17, 1939 |
| 2,247,294 | Goble | June 24, 1941 |
| 2,396,091 | Bey | Mar. 5, 1946 |
| 2,400,641 | Hardy | May 21, 1946 |

FOREIGN PATENTS

| Number | Country | Date |
| --- | --- | --- |
| 102,039 | Sweden | July 15, 1941 |
| 546,488 | Great Britain | July 19, 1942 |

OTHER REFERENCES

Popular Science of December 1943, page 67.